United States Patent
Lamoriniere et al.

(10) Patent No.: US 9,739,626 B2
(45) Date of Patent: Aug. 22, 2017

(54) JOURNEY PLANNING METHOD AND SYSTEM

(71) Applicant: Amadeus S.A.S., Sophia Antipolis (FR)

(72) Inventors: Cedric Lamoriniere, Juan les Pins (FR); David Benque, Mouans Sartoux (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 14/230,036

(22) Filed: Mar. 31, 2014

(65) Prior Publication Data
US 2015/0276410 A1 Oct. 1, 2015

(51) Int. Cl.
*G06Q 10/02* (2012.01)
*G01C 21/34* (2006.01)

(52) U.S. Cl.
CPC ................................ *G01C 21/3484* (2013.01)

(58) Field of Classification Search
None
See application file for complete search history.

(56) References Cited

U.S. PATENT DOCUMENTS

2006/0265256 A1  11/2006  Galperin et al.
2009/0276250 A1*  11/2009  King ...................... G06Q 10/02
                                                            705/5
2012/0226647 A1   9/2012  Murray et al.
2013/0345953 A1* 12/2013  Udeshi et al. ................ 701/117
2014/0088820 A1*  3/2014  Jericho et al. ............... 701/32.3
2014/0278615 A1*  9/2014  Ince .................... G06Q 10/025
                                                            705/6
2015/0031390 A1*  1/2015  Robertson et al. ........ 455/456.1

OTHER PUBLICATIONS

IP Australia, Patent Examination Report No. 1 issued in corresponding Application No. 2015201619 issued Dec. 10, 2015, 3 pages.

* cited by examiner

*Primary Examiner* — Redhwan k Mawari
*Assistant Examiner* — Paul Castro
(74) *Attorney, Agent, or Firm* — Thompson Hine LLP

(57) ABSTRACT

Methods, systems, and computer program products for generating journey options in response to a journey request from an origin to a destination. Routes from the origin to the destination are selected as candidates to fulfill the journey request. Delay-related statistical information is derived from delay-related data for past journeys. A minimum connecting time at a connection between first and second segments of each route is estimated based on the statistical information. Journey combinations are determined from the routes based on origin departure time, destination arrival time, and schedule information for the first and second segments of each route. For each route in each journey combination, a determination is made whether the schedule information for the first and second segments satisfies a condition related to the minimum connecting time. Each journey combination for which the condition is satisfied by each route comprising the journey combination is selected as a journey option.

16 Claims, 9 Drawing Sheets

| 40a | 40b | 40c | 40d |
|---|---|---|---|
| TRAVEL CARRIER DATA | GEOGRAPHICAL DATA | SCHEDULED TIMETABLE DATA | ACTUAL TIME DATA |
| •IDENTIFIER<br>•TRAVEL PROVIDER OR COMPANY | •DEPARTURE LOCATION<br>•ARRIVAL LOCATION | •DEPARTURE TIME<br>•ARRIVAL TIME | •DEPARTURE TIME<br>•ARRIVAL TIME<br>•DELAY CAUSES |

FIG. 4

| 150 | 151 | 152 | 153 |
|---|---|---|---|
| JOURNEY DELAY STATISTICS | SATURATION STATISTICS | CONNECTION TIME STATISTICS | JOURNEY CONDITION DATA |

FIG. 5

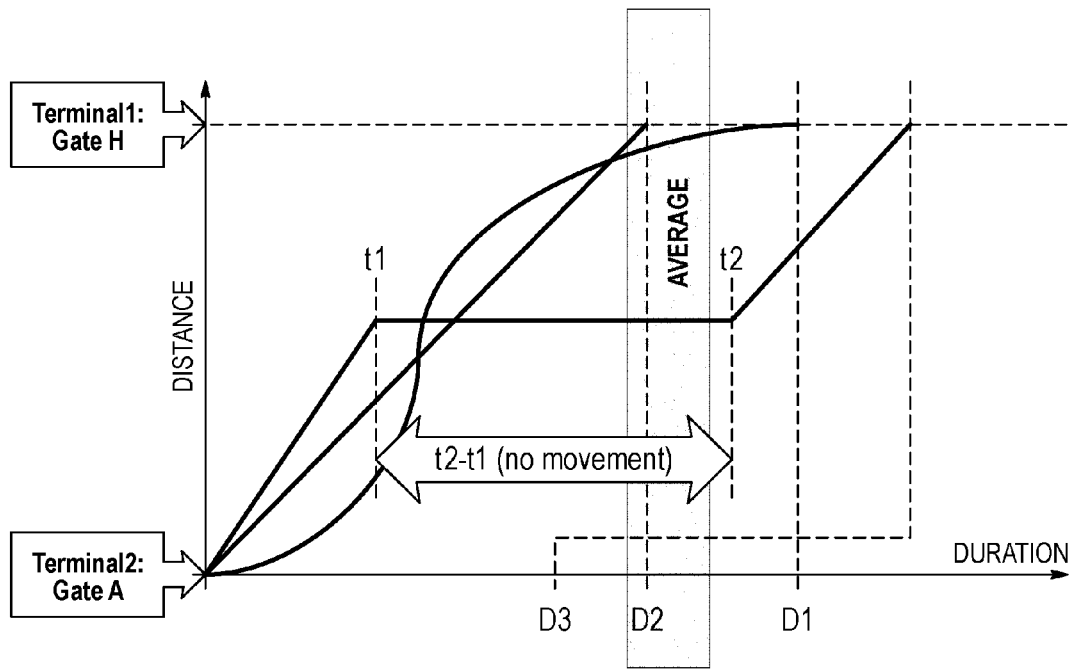

FIG. 6

JOURNEY PLANNING METHOD AND SYSTEM

BACKGROUND

The invention generally relates to computers and computer software and, in particular, to methods, systems, and computer program products for planning journeys.

Journey planners, such as flight travel planning systems, may be used to search for the best journey between a starting geographical location (i.e., an origin) and an ending geographical location (i.e., a destination) based on criteria supplied by a user. Such criteria may include distance or speed criteria, depending on whether the traveler expects the shorter journeys or quicker journeys to be returned, and may also include cost criteria if the traveler wishes to optimize the travel cost. The journey planner may determine the journeys satisfying the criteria using a database containing scheduling information related to different travel providers. Such scheduling information may include timetable information, geographic information, and price information.

Journey planners may also be configured to optimize the segmentation of proposed journeys by minimizing the number of connections in the journey and by defining a default minimum time duration for each connection (i.e., a minimum connection time or MCT). A connection connects two segments of an associated journey. Each segment of a journey may be associated with a flight, a train, a bus, a boat, or any other type of passenger-carrying vehicle that is organized according to schedule information (e.g., scheduled departure time, scheduled arrival time, etc.).

At the connection, the traveler must move from an arrival location for an initial segment of the journey to a departure location for the next segment. The arrival location may be an arrival gate for a flight in a given terminal of an airport and the departure location may be a departure gate for a subsequent flight in a different terminal of the airport. The length of the minimum connection time is generally predefined empirically to allow sufficient time for the traveler to move from the arrival location to the departure location and then check-in for the subsequent segment. The length of the minimum connection time should also be minimized to limit the total travel duration for the journey. Journey planners may thus be configured to select journey options such that the consecutive segments satisfy a minimum connection time at a connection.

The minimum connection time is a static and theoretical value that takes into account the duration separating the arrival time of the initial segment and the departure time of the subsequent segment. However, because it is static, the minimum connecting time fails to consider the possible delays that may accumulate in the initial segment of a journey. As a result, the traveler may arrive at the departure location of the subsequent segment either after the flight has departed or too late to check-in.

If the traveler misses the travel connection, then the traveler is then forced to be rerouted on another flight, train, etc. that covers the subsequent travel segment. To limit traveler complaints related to delays, travel companies have improved the way in which they communicate information related to delays and may even provide online real-time information about delays. However, these measures are only applied after the delays have already occurred.

Improved methods, systems, and computer program products are needed for planning journeys that preventatively limit the risk that a traveller will miss a connection and/or arrive late at their final destination.

SUMMARY

Embodiments of the invention are directed to methods, systems, and computer program products for generating journey options in response to a request for a journey from an origin to a destination. Routes from the origin to the destination are selected as candidates to fulfill the journey in the request. Delay-related statistical information is derived from delay-related data for past journeys. A minimum connecting time at a connection between a first segment and a second segment of each route is estimated based on the statistical information. Journey combinations are determined from the routes based on a departure time from the origin, an arrival time at the destination, and schedule information for the first and second segments of each route. For each route in each journey combination, a determination is made whether the schedule information for the first and second segments satisfies a condition related to the minimum connecting time. Each journey combination for which the condition is satisfied by each route comprising the journey combination is selected as one of the journey options.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 4 is a diagrammatic view of the structure of the delay-related data in accordance with an embodiment of the invention.

FIG. 5 is a diagrammatic view of the structure of the statistics information on delay in accordance with an embodiment of the invention.

FIG. 6 is an exemplary graph illustrating different phases achieved by three different travelers during a same travel connection.

DETAILED DESCRIPTION

Figure 1:
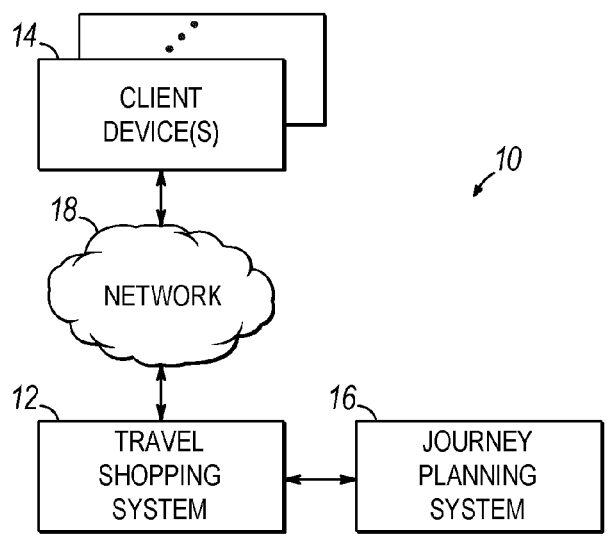
FIG. 1 is a diagrammatic view of an exemplary operating environment including a plurality of computer systems.

With reference to FIG. 1, an operating environment 10 may include a travel shopping system 12, one or more client devices 14, and a journey planner in the form of a journey planning system 16. The shopping system 12, one or more client devices 14, and journey planning system 16 are coupled to a network 18, which may include one or more private and/or public networks (e.g., the Internet) that enable the exchange of data. A user (e.g., a traveler or a travel agent) can book a ticket or obtain shopping information at the travel shopping system 12. The travel shopping system 12 interacts with the journey planning system 16 for generating journey options according to the various embodiments of the invention.

The user may communicate with the travel shopping system 12 through one of the client devices 14 connected to the travel shopping system 12 over the network 18. Each client device 14 may be any suitable computing system configured to communicate over the network 18. Each client device 14 may comprise a desktop, laptop, or tablet computer, a smart phone, a personal digital assistant, or any other mobile or fixed computing device that enables the traveler to search for and book travel services over the network 18. For example, each client device 14 may include a client application, such as a web-browser, that communicates with a server application hosted by the travel shopping system 12, such as a web-server. The server application at the travel shopping system 12 may, in turn, communicate with one or more global distribution systems and/or carrier systems to obtain data relating to available travel options.

The travel shopping system 12 may be configured to provide travel services, including shopping or booking information, to the user. The travel shopping system 12 may include a dedicated user interface that can be used to exchange information with the user's client device 14. In particular, the user may submit a travel request (also referred to hereinafter as a "journey request") or provide user inputs through the user interface. The travel shopping system 12 may in turn cause the results obtained for a given user request to be displayed at the user's client device 14. Such results may include a set of journey proposals (also referred to hereinafter as "journey options" or "travel options") and auxiliary information, such as price information for the journey proposals. The user may select and book one of the journey options. The travel shopping system 12 may be hosted in a public website accessible to any user and including an intuitive user interface to allow direct travel shopping by any user. Alternatively, the travel shopping system 12 may be a specialized system provided for travel operators or agents and accessible through a private website or a private application.

As used herein, a journey option refers to a travel between an origin location and a destination location, and is associated with scheduling information including the scheduled departure date and time of the journey and the scheduled arrival date and time of the journey. A journey may include a set of segments that interconnect at a connection point (e.g., an airport or train station) or a connection hub (e.g., an airline hub or other public transport hub). Each segment is associated with schedule information (i.e., departure/arrival dates and times). A connection between consecutive segments of a journey refers to a change from a passenger-carrying vehicle (e.g., an aircraft, ship or other type of conveyance) associated with an initial segment (e.g., an arriving flight) to another passenger-carrying vehicle associated with a subsequent segment (e.g., a departing flight) during the same journey. The user disembarks (e.g., deplanes) from the inbound passenger-carrying vehicle servicing the initial segment and moves from the arrival location of the initial segment (e.g., at a terminal at an airport) to the departure location of the subsequent segment (e.g., a different terminal at the airport or a different gate inside the same terminal at the airport) to board the outbound passenger-carrying vehicle (e.g., an aircraft). The initial and subsequent segments may be provided by the same travel provider (e.g., the same airline) or by different travel providers (e.g., different airlines).

Figure 2:
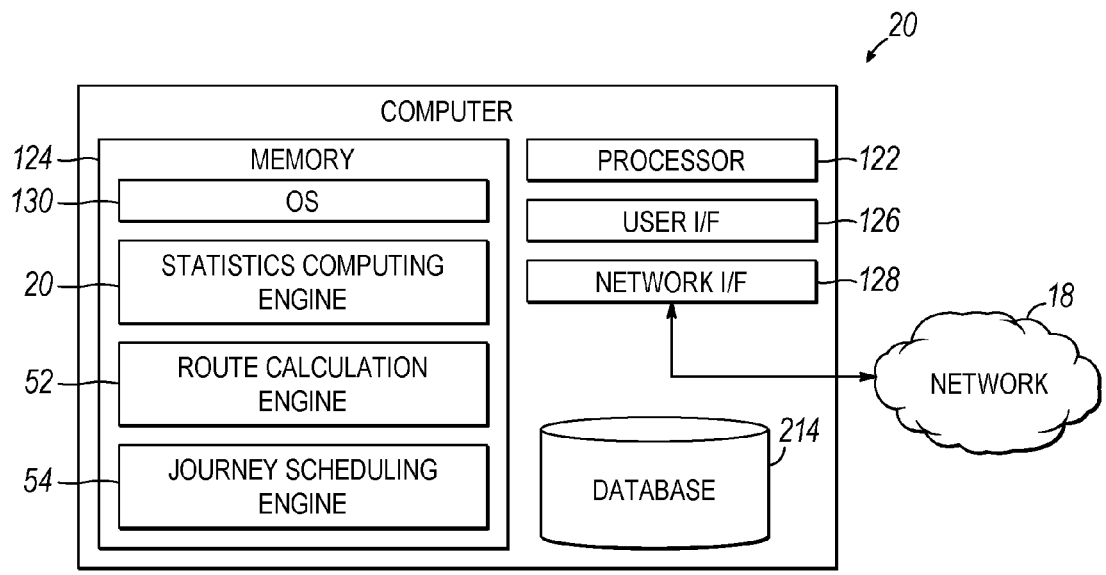
FIG. 2 is a diagrammatic view of an exemplary computer system of FIG. 1.

FIG. 2 provides a block diagram that illustrates the components of the one or more servers of a computer system that may comprise the journey planning system 16 in accordance with an embodiment of the invention. The journey planning system 16 includes at least one processor 122 including at least one hardware-based microprocessor and a memory 124 coupled to the at least one processor 122. The memory 124 may represent the random access memory (RAM) comprising the main storage of the journey planning system 16, as well as any supplemental levels of memory, e.g., cache memories, non-volatile or backup memories (e.g., programmable or flash memories), read-only memories, etc. In addition, memory 124 may be considered to include memory storage physically located elsewhere in the journey planning system 16, e.g., any cache memory in a microprocessor, as well as any storage capacity used as a virtual memory, e.g., as stored on a mass storage device or on another computer coupled to the journey planning system 16.

For interface with a user or operator, the journey planning system 16 may include a user interface 126 incorporating one or more user input/output devices, e.g., a keyboard, a pointing device, a display, a printer, etc. Otherwise, data may be communicated to and from another computer or terminal (e.g., the travel shopping system 12) over a network interface 128 coupled to the communication network 18. The journey planning system 16 also may be in communication with one or more mass storage devices, which may be, for example, internal hard disk storage devices, external hard disk storage devices, external databases, storage area network devices, etc.

The journey planning system 16 typically operates under the control of an operating system 130 and executes or otherwise relies upon various computer software applications, components, programs, objects, modules, engines, data structures, etc. In particular, the components may include a statistics computing engine 20, a route calculation engine 52, and a journey scheduling engine 54, and may comprise instructions that may be resident and/or stored in the memory 124.

The journey planning system 16 may include one or more databases including, for example, a database 214. The database 214 may comprise data and supporting data structures that store and organize data that is maintained and used by the journey planning system 16. In particular, the database 214 may be arranged with any database organization and/or structure including, but not limited to, a relational database, a hierarchical database, a network database, and/or combinations thereof. A database management system in the form of a computer software application executing as instructions on the processor 122 of the journey planning system 16 may be used to access the information or data stored in records of the database 214 in response to a database query.

Moreover, various applications, components, programs, objects, modules, engines etc. may also execute on one or more processors in another computer coupled to the journey planning system 16 via the communication network 18, e.g., in a distributed or client-server computing environment, whereby the processing required to implement the functions of a computer program may be allocated to multiple computers over a network. For example, some of the functionality described herein as being incorporated into the journey planning system 16 and/or components of the journey planning system 16 may be implemented in one or more servers. Consistent with embodiments of the invention, the modules, applications, components and/or engines may be executing on one or more servers of the journey planning system 16, and may cause the processor 122 of the journey planning system 16 to perform operations consistent with embodiments of the invention.

Figure 3:
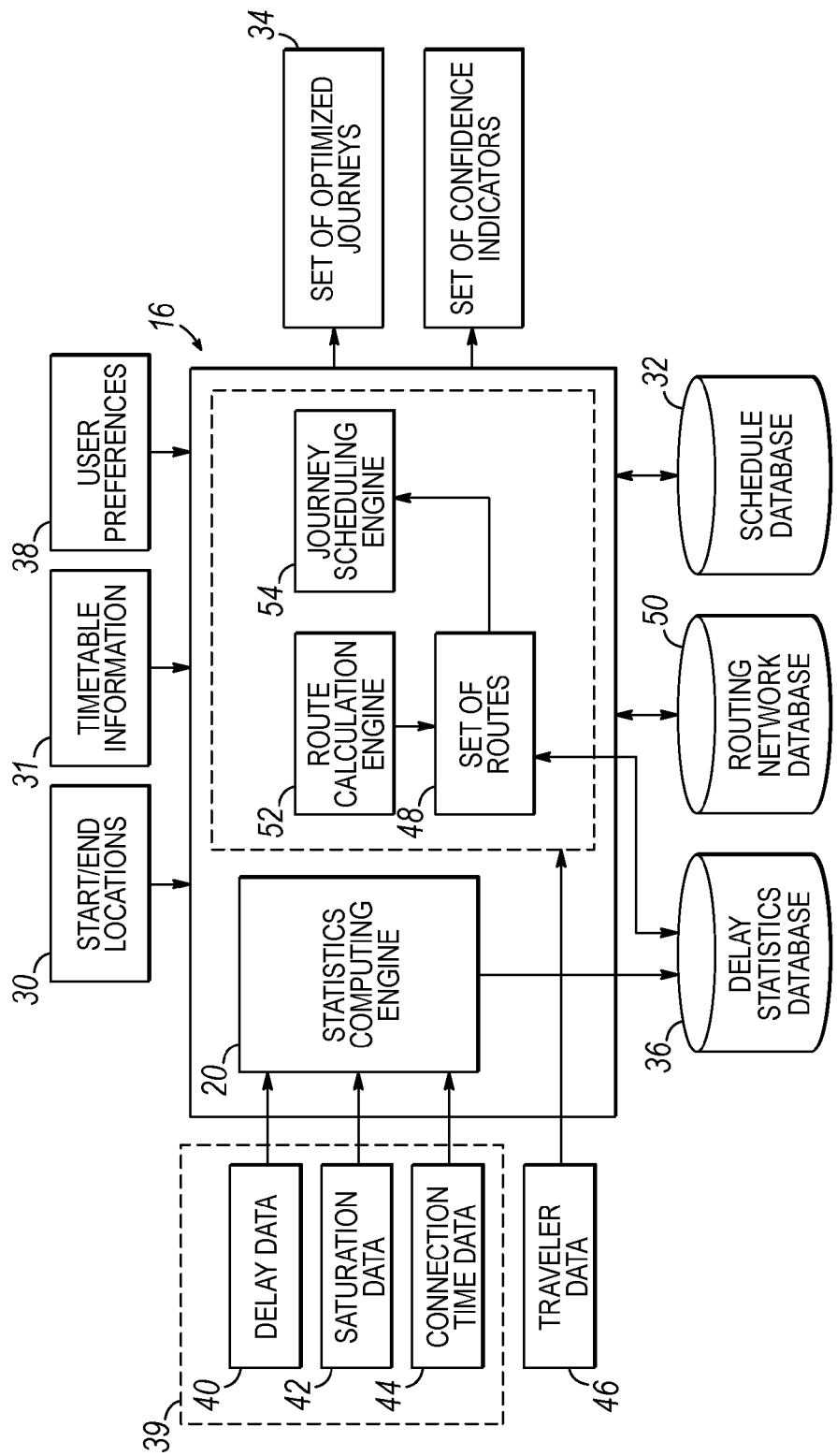
FIG. 3 is a schematic diagram of a journey planning system in accordance with an embodiment of the invention.

FIG. 3 shows the architecture of a journey planning system 16 according to an embodiment of the invention. The journey planning system 16 may receive a journey request from a user. The journey request may identify locations 30 including a start location (also referred to herein as a "departure" location or "origin" location) and an end location (also referred to herein as an "arrival" location or "destination" location). Each location in the journey request may have the form of a city location or a specific point of access in a city, such as an airport or terminal if aviation is the mode of transport, a station if rail is the mode of transport, or a street address or a specific city point of access. In certain embodiments of the invention, the journey planning system 16 may convert the start and end locations into geographic coordinates, such as GPS coordinates (e.g., latitude and longitude), to determine the closest corresponding point or points of access. If the user's client device 14 is capable of providing location data, the journey planning system 16 or the travel shopping system 12 coupled to the journey planning system 16 may automatically detect the start location of the user based on the location data.

Alternatively, the journey planning system 16 may use databases comprising schedule information including information about the different points of access available through the travel network (for example, airports or terminals if the mode of transport is aviation). In a representative embodiment, the journey planning system 16 is coupled to a schedule database 32.

The journey planning system 16 may be configured to schedule travel for a specific mode of transport (e.g., aviation or rail), a specific type of travel provider (e.g., an airline), or multiple transport modes independent of the type of travel provider (e.g., both flight and rail modes of transport). If the journey planning system 16 is multi-modal in this way, the computed journey options may include segments related to the different transport modes and the user may specify user preferences 12 related to preferred modes of transport.

The journey planning system 16 may be configured to determine a set of optimized journeys 34 (also referred to herein as "travels" or "trips") in response to a journey request from a user (specifying start and end locations 30 and timetable information 31) using a delay statistics database 36 storing data relating to travel delays.

The user can initially submit a journey request by inputting the start and end locations 30 corresponding to the requested journey through a dedicated interface (for example, a user interface coupled with the travel shopping system 12). The start location corresponds to a desired geographical location of the journey departure while the end location corresponds to a desired geographical location of the journey arrival. The user can also use the user interface to enter departure and arrival timetable information 31 (also referred to herein as "time information") including desired date information or desired date and time information associated with the departure and with the arrival of the requested journey. The user may also input user preferences 38 as data through the interface. The user preferences 38 may include ranking criteria or factors (e.g., cost, distance, or speed criteria) that the journey planning system 16 may use to compute the best or optimum journeys.

The journey planning system 16 may determine the statistical delay information stored in the delay statistics database 36 from delay data 40 related to past journeys and collected over a selected period of time, and information related to delay-condition factors collected over predefined time periods, such as connection conditions data 42 and 44. The connection condition information may include transport infrastructure congestion conditions 42 (also referred to as "saturation data") that can cause some delays at journey connections, and/or connection time data 44. The connection time data 44 represents connection times needed over selected past periods for a set of travelers with different profiles to achieve a connection.

With reference to FIG. 4, the delay data 40 may comprise scheduled timetable data 40c and actual time data 40d for the segments of each past journey. The scheduled data may include scheduled departure and arrival times, and the actual time data 40d may include the actual departure and actual arrival times. The delay data 40 may also include additional information about the causes of an actual delay (i.e., the cause of a difference between the scheduled and actual times) as part of, for example, the actual time data 40d, so that certain exceptional delay is not taken into account when computing the statistics information. The delay data 40 may also include geographical or location data 40b about the past journey, such as the departure location and the arrival location, and travel carrier data 40a associated with the segments of each past journey. The travel carrier data 40a may include an identifier (e.g., a flight or train number) and information relating to the travel provider (e.g., an airline name).

A feeder part of the journey planning system 16 may receive new delay data 40 each time that a passenger-carrying vehicle (e.g., an aircraft) for a given travel provider completes a trip. Alternatively, delay data 40 including records accumulated over a period of time may be periodically pushed to the journey planning system 16. All information (new and past information) can be aggregated by the statistics computing engine 20 in order to populate the delay statistics database 36.

The travel delay data 40 may comprise other data depending on the application of the embodiments of the invention. The travel delay data 40 may further include additional timetable data such as the time difference between scheduled departure date/time and actual departure date/time, the time difference between scheduled arrival date/time and actual arrival date/time, information about cancellation of a journey, actual delay, time difference between scheduled take-off and actual take-off (for flights), and time difference between scheduled boarding and actual boarding (for flights). The travel delay data 40 may further include additional non-timetable delay data, such as delay reason (e.g., technical problem, inclement weather conditions, labor strike, road/airport works, accidents, passenger illness), a stopover list (in particular for trains) with the possible delay information by stopover, and occupancy rate of the travel provider. The delay information 40 may include other information related to the journey segment, such as weather conditions during the travel, type of the day (e.g., weekday or weekend), and certain travel periods (e.g., holidays, a long weekend, or special events).

Saturation data 42 may also be collected that relates to congestion states in certain areas of transport infrastructures used by travelers during a journey connection. The saturation data 42 may be determined by transport infrastructure computing systems (e.g., airport IT infrastructure) from detected information related to congestion or saturation in certain areas of the transport infrastructure. In certain mobile applications, such saturation data 42 may be collected from the mobile devices of users based on transport infrastructure cartography. For example, if the security check area is crowded with users and lengthy delays are being experienced, saturation data 42 can be transparently detected from mobile devices and used to determine that the security checkpoint area is suffering from saturation.

The connection time data 44 may be collected from different sources per connection and for a selected set of travelers. Alternatively, connection time data 44 may be collected from mobile client devices 14 equipped with mobile applications (i.e., traveler movement detection applications) that make it possible to associate traveler movement during a connection with the actual traveler itinerary. The traveler movement detection applications installed in mobile electronic devices can use such geo-location, as well as the journey information stored in the passenger personal information, to detect when the traveler is moving during a connection between two segments of a journey. The mobile application may be used also to determine the actual arrival location (e.g., airport gate) of the initial segment of a connection and the actual departure location (e.g., airport gate) for the subsequent segment of the connection. The actual connection time data may be further refined by removing traveler stop durations that are detected by the traveler movement detection applications. The movement of the traveler may be alternatively retrieved according to different technologies (e.g., airport closed-circuit television using face recognition).

FIG. 6 shows exemplary transfer times needed by three different travelers to move from the arrival gate of the first segment of a connection ("gate A" in terminal 2) to the departure gate of the second segment of a connection ("gate H" in terminal 1). D1 represents the time needed for a first traveler to move from gate A to gate H, D2 represents the time needed for a second traveler to move from gate A to gate H, and D3 represents the time needed for a third traveler to move from gate A to gate H. As shown, the first traveler and the second traveler did not move at the same speed, and neither of these travelers made a stop at a particular location. In contrast, the third traveler made a stop of certain time duration during his connection (e.g., a stop to shop, eat, or converse with someone). The connection time data for each traveler is thus derived from the total time required to move from gate A to gate H, possibly by removing the time durations for the detected stops during the connection.

With renewed reference to FIG. 3, the journey planning system 16 may be configured to collect delay-related data, which is generally indicated by reference numeral 39, for a large number of segments per travel provider over selected periods of time (past periods) from different sources such as travel providers systems, travel providers websites, internal airport management applications, inventory system, train operations management (IT), travel intermediaries such as GDS, travel data providers, open data sources. The collected delay-related data 39 may be maintained as data in a delay information databases.

The journey planning system 16 may comprise at least one feeder engine (not shown) for collecting the delay-related data 39 from different sources. Alternatively, the delay-related data 39 may be periodically or on-demand pushed from a server of at least one external entity responsible for collecting such information. For example, each time that a passenger-carrying vehicle (e.g., an aircraft, a train, or other type of conveyance) arrives at a final destination, a dedicated travel management application (e.g., an airport travel application) may push the delay-related data 40, 42, 44 to the journey planning system 16. Each feeder engine may be configured to convert the delay-related data 40, 42 and 44 received from different sources into a generic format. This allows the journey planning system 16 to operate independent of the format of the delay-related data 39 that is received from the different sources.

According to certain embodiments of the invention, the journey planning system 16 may comprise at least one statistics computing engine 20 for computing delay-related statistical information on delay from the delay-related data 39. Alternatively, the statistical information may be computed from the delay-related data 39 by a system at an external entity and either on-demand or periodically pushed to the journey planning system 16. The delay-related statistical information may be stored in the delay statistics database 36.

With reference to FIG. 6, the statistical information computed from the delay-related data 39 may include statistical data on journey delay (i.e., "journey delay statistics") derived from the delay data 40 related to past journeys and stored in database 150, transport infrastructure saturation statistics derived from the saturation data 42 and stored in database 151, and connection time statistics derived from the past connection time data 44 and stored in database 152. The saturation statistics represent the risk of congestion for some areas of the transport infrastructures involved in journey connections. The connection time statistics represent average connection times needed for a traveler to move from the arrival location of an inbound segment at a connection to the departure location of an outbound segment of the connection, and are determined for each connection of different journey schedules. The connection time statistics may be categorized and provided according to different user profiles depending on, for example, traveler age, traveler specificities such as the traveler level (e.g., frequent traveler, etc.), traveler mobility level (e.g., special handicap), etc.

Based on the delay-related data 39 accruing or accumulating over time, several types of journey delay statistics can be computed. For example, for each subset corresponding to an origin location, a destination location, and a given segment, the average delay over a selected period of time can be computed. As another example, for each subset corresponding to an origin location, a destination location, and a given segment, the average delay of a flight over a given period of time per schedule can be computed. As yet another example, for each subset corresponding to origin location, a destination location, and a given segment, the average delay of a flight for each day of the week can be computed. As yet another example, for each subset corresponding to an origin location, a destination location, and a given segment, the average delay of a flight for each day of the week can be computed for a selected annual period (holiday period, summer period, etc.).

The saturation statistics may include the congestion level of the transport infrastructure (e.g., train station, airport) or, alternatively, an average delay expected due to the congestion level of the transport infrastructure for each subset corresponding to a connection origin location, a day of the week, and a given period of the year.

The journey planning system 16 may be configured to dynamically generate optimal journey options based on the statistical information on delay. The journey planning system 16 may also receive journey condition data in the form of forecasts, such as weather forecasts or special calendar information (e.g., holidays, non-working days, special events) that can be used to determine the journey options.

The journey planning system 16 may be configured to dynamically calculate a minimum connection time (e.g., a minimum transfer time or eMCT) for each journey request, and for each possible connection between two segment schedules from the delay statistics data. The journey planning system 16 may be further configured to only select journey options that include connections respecting or meeting the minimum connection times that are estimated for these connections. As a result, the risk is reduced that a traveler will miss a connection of a selected journey among the possible journey options.

The connection time statistics may be maintained in user profiles. In this instance, the journey planning system 16 may also use traveler data 46 (FIG. 3) to dynamically compute the minimum connection time. Traveler data 46 may comprise specific characteristics of the traveler (e.g., age of the traveler or a particular special handicap) that may impact the time needed to move from the arrival location at the connection of the initial segment to the departure location at the connection of the subsequent segment. Traveler information 16 may be derived from an existing traveler profile. Traveler information 16 may also be derived from specifications in the journey request, such as an indication that the journey request pertains to a group of individuals including young children.

The journey planning system 16 may provide the best journeys options between the origin location and the destination location that optimize the ranking factor (e.g., distance, speed, or cost) and that include a minimal number of connections. At the same time, journey planning system 16 may select each connection such that the likelihood that the traveler will miss, for example, a flight at the connection is limited, and that the likelihood that the traveler will arrive at the final destination with a minimum delay is optimized. A traveler may travel with reduced anxiety with respect to each connection and his or her professional or personal constraints at the final destination. From the perspective of a travel provider, losses of revenue may be limited and better organization processes may be implemented. Further, traveler complaints may be reduced.

With renewed reference to FIG. 3, in response to a journey request, the journey planning system 100 may be configured to calculate candidate routes 48 from the start location to the end location identified in the journey request so as to optimize one or more ranking factors (such as the distance, speed, or cost) and based on routing network data maintained in a routing network database 50. The routing network data may include, for example, flight schedule information and routing information for the transport network of one or more air carriers. The candidate routes 48 are each capable of fulfilling the journey request. Further, for a set of connections of each candidate route 44, the journey planning system 16 may be configured to dynamically calculate a minimum connection time for each connection based on the statistical delay determinations, and only construct journey options 34 for routes with connections that respect or meet the associated dynamic minimum connection times based on scheduling data maintained in the schedule database 32.

The journey planning system 16 may comprise a route calculation engine 52 configured to calculate the candidate routes 48 that are candidates to fulfill the journey request and a journey scheduling engine 54 configured to determine the optimized journey options 34. The route calculation engine 52 is configured to determine the optimum routes based on the ranking criteria from the routing network data. The journey scheduling engine 54 computes the best journey options based on the statistical information on delay so as to limit the probability that the traveler will miss a travel segment at a connection (e.g., an outbound flight at the connection) in a journey option. The journey scheduling engine 54 may further be configured to, using the statistical information on delay, only select journey options depending on a predicted delay level or to provide a delay indicator to the user in association with each proposed journey option.

The journey planning system 16 may be further configured to display the set of journey options 34 and the respective delay indicators on the user interface. The traveler may reply upon the delay indicator to select a preferred journey option in order to minimize the impact of possible delays during the journey, or to adjust the time for any appointments scheduled by the traveler at the final destination and limit the time other people may be waiting for his or her arrival.

The journey planning system 16 may further operate based on the user preferences 38 specified in the journey request, such as selected options related to via or direct routes, minimization of the number of connections, or specification of an expected arrival time.

Figure 7:
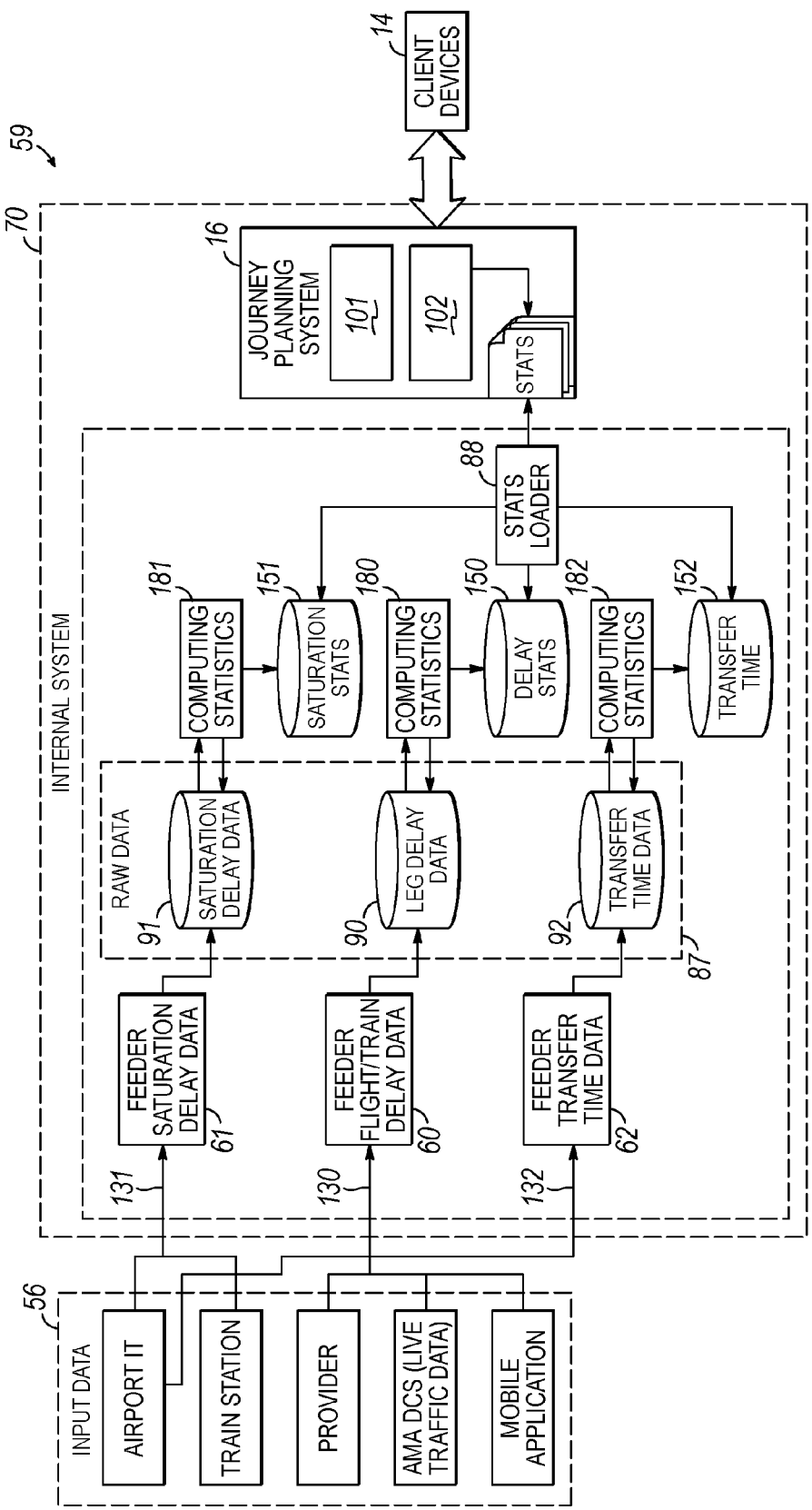
FIG. 7 is a schematic diagram representing the feeding part of the journey planning system in accordance with an embodiment of the invention.

With reference to FIG. 7 and in accordance with an alternative embodiment, a system architecture 60 includes the journey planning system 16 and a separate delay processing engine 70 coupled to the journey planning system 16. The delay processing engine 70 computes the statistical information on delay and feeds the journey planning system 16 with the statistical information on delay. The delay data 39 may be received by the delay processing engine 70, which may include at least one statistics computing engine 20 to compute statistical information from the raw delay-related data 56. In the system architecture 60, the statistical information may be pushed to the journey planning system 16 by the delay processing engine 70.

The system architecture 60 may include a plurality of feeders 60, 61, 62 configured to collect the delay-related data 56 from the different sources, such as travel intermediaries like global distribution systems, travel data providers, open data sources, etc. The collected information may be maintained in a delay-related data database 87 or alternatively in a plurality of separate databases 90, 91 and 92 dedicated to each different type of data (respectively, travel delay data 130, saturation delay data 131, and connection time data 132). The system architecture 60 includes statistics computing engines 180, 181, and 182 that may be respectively used to determine the travel delay statistics data stored in database 150, the saturation statistics data stored in database 151, and the connection time statistics data stored in database 152. Alternatively, the statistics data may be maintained in a single database rather than multiple databases.

The journey planning system 16 may also include a statistics loader 88 for periodically pushing the statistics data from the statistics information databases 150, 151, and 152 to the memory of the journey planning system 16. This may limit the network overlay and access the data as if the data were stored in an internal database structure of the journey planning system 16.

Figure 8:
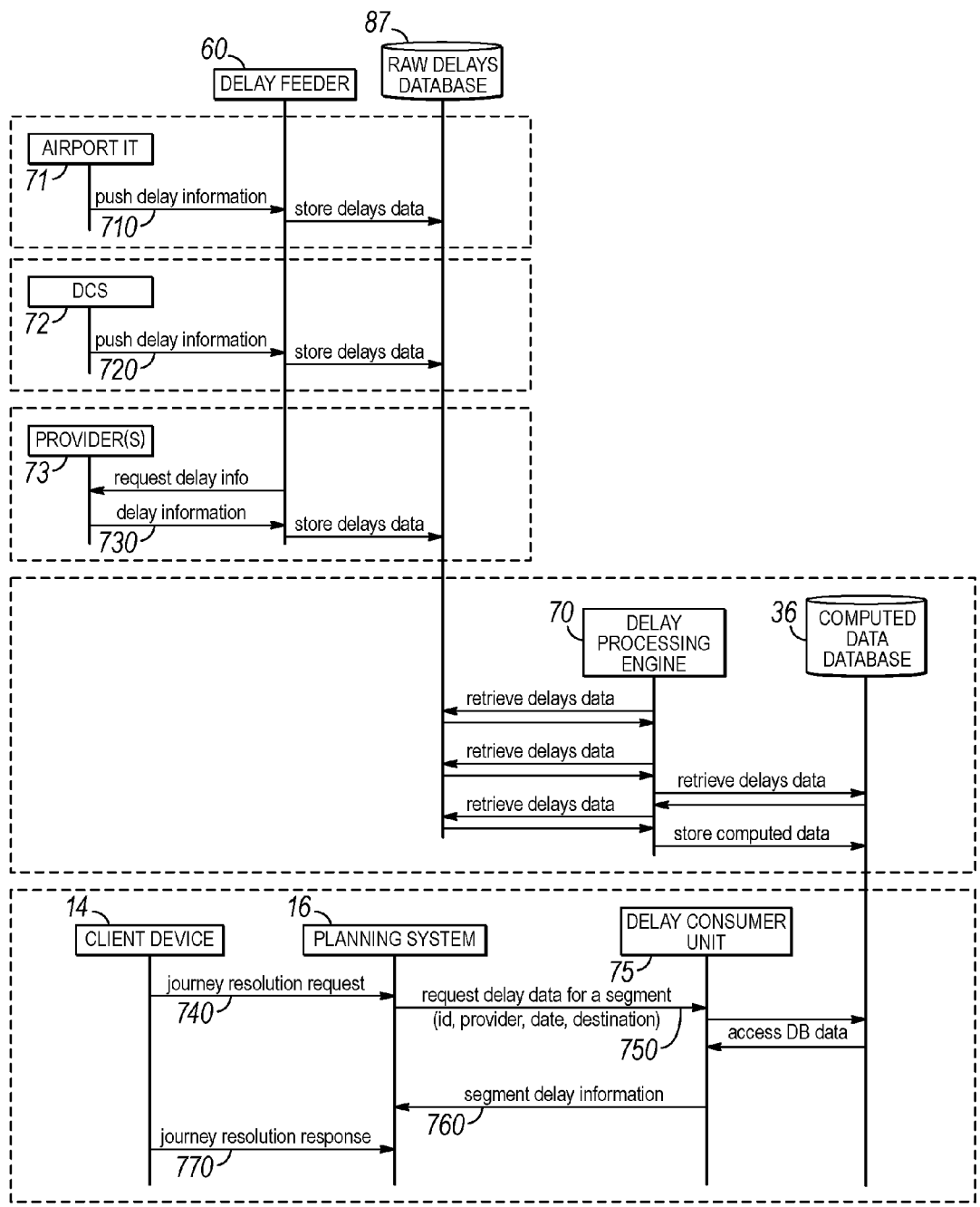
FIG. 8 is a sequence diagram illustrating the data exchanged by the journey planning system in accordance with an embodiment of the invention.

FIG. 8 represents a sequence diagram illustrating exemplary interactions in a time sequence between data feeders 60, 61, or 62 and different sources 71, 72, 73 for collecting delay-related data and pushing the delay-related data 130, 131, or 132 to the journey planning system 16, according to the exemplary architecture of FIG. 7. More specifically, as shown in the example of FIG. 8, each of the feeders 60, 61, 62 may collect delay-related data from different sources, such as an airport computing system 71, a travel intermediary 72 (e.g., a departure control system), or travel providers 73. Each collecting action may be initiated by the sources 71, 72 by communicating messages 710, 720 that respond to a travel event, such as a train/flight arrival or departure, or as a result of a periodic update event or creation of new activity reports. A collecting action, as indicated by message 730, may be also triggered by the journey planning system 16 by submitting a request. The collected information is then stored as delay-related data in the database 87. The delay processing entity 600 may operate asynchronously and continuously on the delay data stored in the information database as a result of the actions associated with messages 710, 720 and 730.

The statistics computing engines 180, 181 and 182 may update and improve the statistics information stored in the statistics delay information databases 150, 151 and 152 in response to the reception of new raw information 13. In particular, the statistics computing engine 180 may compute a number of statistics delay parameters for each travel segment (e.g., train/flight segment) based on the delay data maintained in the delay information database 90.

In response to a journey request in a message 740 received from a client device 16, the journey planning system 16 may retrieve statistics delay information from database 36 for each segment schedule obtained by the journey scheduling engine 102, directly or through a delay consumer unit 75, in a message 750. The journey planning system 16 may use the retrieved statistics delay information to decide whether the segment should be selected or discarded. Each segment schedule comprises departure/arrival locations, departure and arrival dates and times, and is associated with a given travel provider. The journey planning system 16 may use the information associated with the segment schedule to retrieve the delay-related statistics information related to a given segment schedule. The delay information retrieved by the journey planning system 16 for the segment schedule in message 760 may be used by the journey planning system 16 to determine the journey resolution response. The journey resolution response is communicated to the client device 14 in a message 770 and caused to be displayed as journey options at the client device 14. For example, if the journey request in message 740 specifies that all delayed journeys should be avoided, the journey planning system 16 may discard all segments having high probability of delays from the journey resolution response.

Figure 9:
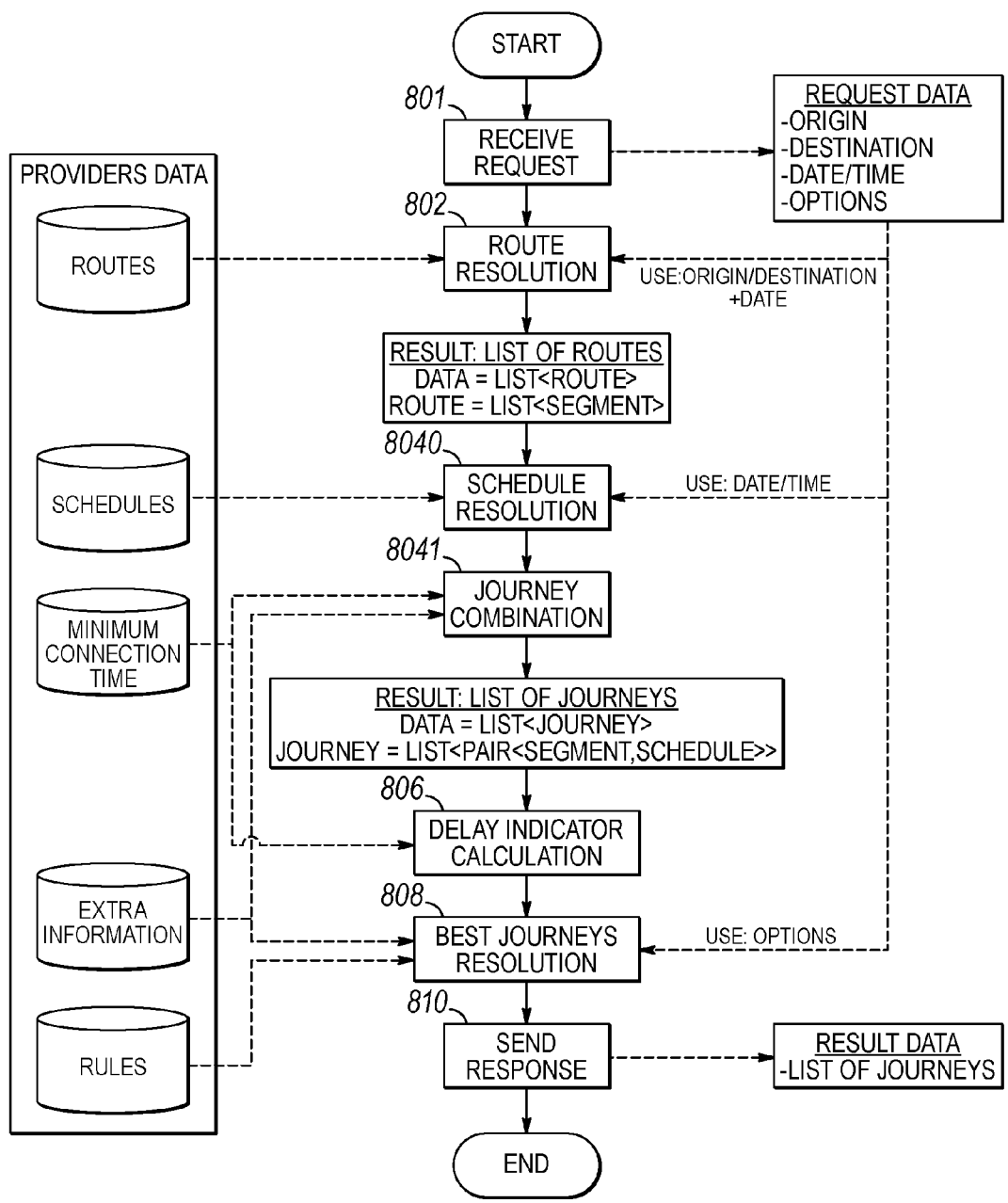
FIG. 9 is a flowchart representing a journey planning method in accordance with an embodiment of the invention.

FIG. 9 is a high-level flowchart of a method for journey planning in accordance with an embodiment of the invention. In response to a journey request (block 800) specifying at least an origin location and a destination location, as well as timetable information for a desired journey (such as date or date and time), a set of candidate routes between the origin location and the destination location are determined by route resolution in block 802 using, for example, routing network information. In certain embodiments of the invention, the timetable date information may be used to further check whether a candidate route is available during the period corresponding to the desired date for the journey (e.g., a route only available during the summer).

The set of routes thus obtained comprises a list of routes. Each route in the list is defined as a list of segments (also referred to as "legs") that are interconnected by a set of connections. As used herein, a route is only associated with routing information (departure/arrival location information). Each route can then provide a number of possible journey combinations depending on scheduling information (departure/arrival dates and times).

In block 804, connections are then built. The building of connections includes a schedule resolution (block 8040) to determine possible segment schedules from the set of candidate routes obtained in block 802 and from the schedule information maintained in the database 32. Each segment is delimited by an origin location and a destination location. From the origin/destination locations, the journey planning system 16 may retrieve a set of possible segment schedules for each segment of a candidate route from the schedule information database 32.

A list of schedules by segment for each segment of a candidate route is provided by block 8040. Each segment is thus associated with a list of possible schedules. As used herein, a "schedule" (also referred to as a "segment schedule") associated with a segment specified by a departure location and an arrival location refers to a scheduled departure date/time at the departure location and a scheduled arrival date/time at the arrival location.

In block 8041, journey combinations may be selected from the set of possible segment schedules obtained for each route taking into account predefined compatibility rules. One such compatibility rule may relate to the minimum transfer time (eMCT) value that is estimated for each connection between a pair of segment schedules. This provides a set of possible journey combinations with connections meeting the eMCT values estimated from the delay statistics constituting the statistical information.

The estimated eMCT per connection may consider past segment delays, actual connection times observed for similar connections in the past, or particular connection conditions that can delay the traveler, such as for example the affluence/congestion of the travel infrastructure (e.g., airport or train station) in certain periods of the year, days of the week, or times of the day. For example, considering a journey composed of two flight segments NCE-CDG and ORY-LAN with a required connection between CDG and ORY, the journey planning method may compute a eMCT for the connection CDG-ORY so as to take into account past congestion, as well as average delays that previously occurred on this schedule for a given period, date, time, and travel provider.

In block 806, delay information associated with each segment schedule obtained during schedule resolution may be determined from the delay information statistics in database 152 (FIG. 8). The delay information may represent the predicted delay for the associated segment schedule. The delay information determined for each segment may be used in the best journey resolution (block 808) to select the best journey options or, alternatively, to compute a delay indicator for each journey option.

In block 808, the best journey options among the journey combinations are selected based on the user preferences 38 and optionally based on the delay information obtained for each segment schedule in block 8041. In addition to selecting the best journey options, a delay indicator may be optionally computed for each journey option.

Each selected journey option thus obtained is associated with one of the candidate routes between the origin location and the destination location, and includes a set of segments. Each segment is associated with schedule information (departure date/time and arrival date/time), and the segments are interconnected by a set of connections (pairs of interconnected segments) so that each connection meets the eMCT value dynamically computed for the connection. The list of journeys thus determined is such that, for each journey option and for each journey connection, the probability that the outbound segment at a connection will be missed by the traveler is minimized.

In block 810, the journey options selected in block 808 are returned to the client device 14 with their respective delay indicators if delay indicators have been requested by the user in the journey request. In particular, the journey options and the information related to the delay indicators are displayed on the user interface (for example, the user interface of the shopping system). The display of the delay indicators may be generated in different ways, such as through graphical elements, visual information, textual information, and/or colors.

The delay information retrieved for each segment schedule in block 806 may be used to compute, for each journey option, a delay indicator representing the probability of delay for the associated journey option or the likelihood of on-time arrival.

The user may specify requirements related to delays through a web form displayed to the user as part of the journey request. The user may elect to receive a delay indicator associated with each journey option. Each delay indicator may be represent, for example, a ranking number ranging from a minimum value (e.g., 1) to a maximum value (e.g., 10) such that the probability that the associated journey will arrive on time increases with increasing ranking number. As another example, as set of delay indicators P can include P=10 if all journeys for the same origin, destination, and date/time timely arrived over a past period, P=8 if all journeys for the same origin, destination and date/time suffered from a minor delay less than a given threshold (e.g., less than 20 minutes) over a past period, and P=2 if all journeys for the same origin, destination and date/time suffered from consequent delays (greater than a given threshold) over a past period. According to the first delay option, the user may request that the delay confidence indicators (FIG. 3) indicating the level of delay that is expected for the associated journey option or the likelihood of arrival on-time for the associated journey option are returned with the journey options. The journey options may be displayed in association with respective delay indicators.

Alternatively, the user may specify in the journey request that only journey options be returned in response to journey request that have a delay indicator greater than a given threshold. The journey planning system 16 may discard journey options that are associated with delay indicators that are less than the given threshold in block 808 so as to only propose journey options to the user that meet the requested condition related to the delay indicator.

The delay information associated with the schedules (obtained in block 806) may be used to compute the delay indicators for the selected best options and generate a display of the delay indicator in association with the corresponding journey option. Alternatively, the delay information associated with the schedules may be used to filter the best journey options depending on the user's requirements (block 808).

Figure 10:
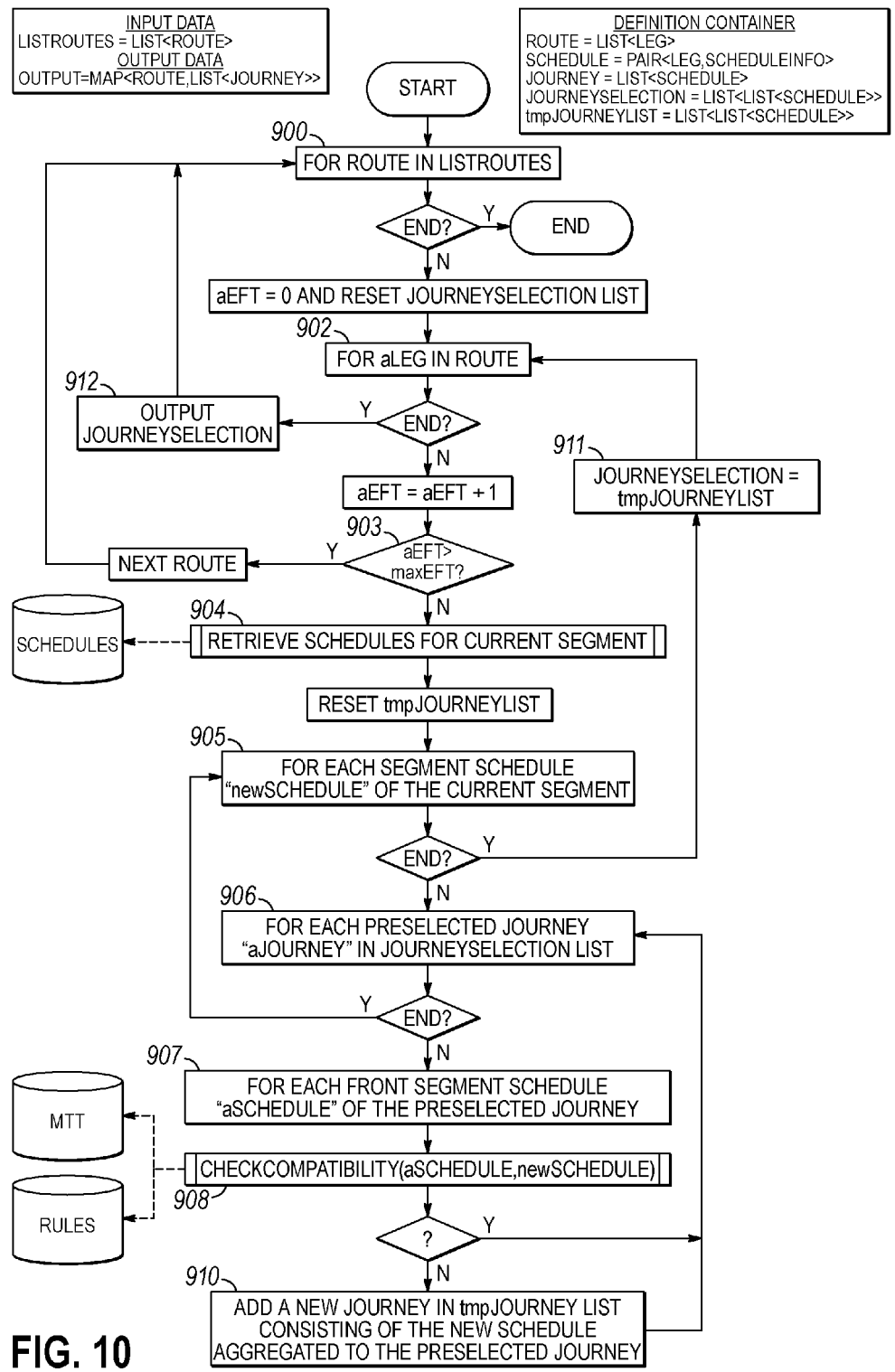
FIG. 10 is a detailed flowchart representing schedule resolution of FIG. 9 in accordance with an embodiment of the invention.

FIG. 10 is a flowchart detailing connection building (block 804 of FIG. 9) that constructs combinations of segment schedules for the candidate routes. In block 900, each route in the set of preselected routes obtained in block 802 is recursively processed, and for each segment "aLeg" of the route (block 902), the possible segment schedules are determined in block 904 using information maintained in the schedule database 32. A determination may be made whether the number of segments of the route (aEFT) exceeds a predefined threshold (maxEFT) (block 903) and the route may be discarded if this condition is met by halting the schedule search for the rest of the route. As the schedule resolution on all of the legs is completed in this instance, proposals that include this route are not selected. This ensures that the journey options will comprise a minimum number of connections.

Possible segment schedules are retrieved in block 904 and may be stored in association with the corresponding segment for the current route. For each segment schedule "NewSegment" retrieved for the current segment of the route (block 905), a check is performed in block 908 to determine whether each segment schedule is compatible with the schedule selected for the previous segment of the route (blocks 906, 907). Thereby, the incompatible segment schedules that do not respect the previously-calculated eMCT are discarded from the final result.

More specifically, the compatibility may be checked in block 908 between every pair of possible segment schedules forming a potential connection to determine whether they meet compatibility conditions using different statistics retrieved from databases 150, 151,152 and the minimum transfer time (eMCT) estimated for each pair of segment schedules. Each pair of segment schedules comprises the current schedule NewSchedule (block 905) of the current segment aLeg of the route (block 902) and the front segment schedule (block 907) of each journey "aJourney" previously selected (block 906) and maintained in a JourneySelection List. If no journey has been previously selected (e.g., if the current segment is the first segment of the route), each segment schedule of the current segment "aLeg" will be added as a candidate journey in the journey selection list JourneySelection( ), in block 910.

If the current pair of segment schedules is compatible (block 908), a new journey is added in a temporary selection list tmpJourneyList( ) comprising the current schedule Newschedule aggregated to the preselected journey aJourney. The next segment schedule of the current segment aLeg can then be iteratively processed in blocks 905 to 910. If all schedules have been processed for the current segment aLeg (block 911), the Journey Selection List JourneySelection is set to the temporary Journey List tmpJourneyList obtained for the current segment aLeg, and a new segment of the route is processed iteratively in blocks 902 to 911.

In response to all segments of the current route being processed, a complete list of journeys corresponding to the route (<Route, List <Journeys>>) is returned in block 912. The list of journeys corresponding to the current route thus comprises compatible segment schedules. The next route is then selected, and is recursively processed according to block 900.

This provides a set of possible journey combinations for each route in which each journey combination corresponds to a route between the origin location and the end location, and includes list of compatible segment schedules in which each segment schedule is associated with a respective segment of the route and is associated with respective scheduled departure/arrival dates and times.

For example, a candidate route Route1 can comprise two legs (Leg1, Leg2). Leg1 has two possible schedules, namely Leg1Sch1, Leg1Sch2, and Leg1 also has two possible schedules, namely Leg2Sch1, Leg2Sch2. Connections can be built for this candidate route by initially processing Leg1 (block 902). In block 904, the schedules for Leg1 are then determined, namely Leg1Sch1, Leg1Sch2. Each schedule of Leg1 (block 905) is then compared with the front schedule of the candidate journey combinations obtained for the previously processed legs (blocks 906, 907, 908). If no previous leg exists, all the schedules for Leg1 are selected as possible journeys in the JourneySelectionList so that the TmpJourneyList comprises only two possible Journey solutions, i.e., JourneySelectionList={Leg1Sch1, Leg1Sch2}.

The connection building method then recursively processes Leg2 (block 902). In block 904, the schedules for Leg2 are determined, namely Leg2Sch1, Leg2Sch2. Each schedule of Leg2 (Leg2Sch1, Leg2Sch2) is then compared with the schedules of the previous leg that is present in the JourneySelection list (blocks 905, 906, 907, 908). Specifically, a compatibility is determined between Leg1Sch1 and Leg2Sch1, a compatibility is determined between Leg1Sch2 and Leg2Sch1, a compatibility is determined between Leg1Sch1 and Leg2Sch1, and a compatibility is determined between Leg1Sch2 and Leg2Sch2. If all segment schedules are compatible, then four journeys are selected in the Journey Selection List JourneySelectionList (blocks 910, 911), namely JourneySelectionList={{Leg1 Sch1, Leg2Sch1}; {Leg1Sch2, Leg2Sch1}; {Leg1Sch1, Leg2Sch1}; {Leg1Sch2, Leg2Sch2}}.

Each element of the journey selection list (e.g., {Leg1Sch1, Leg2Sch1}) represents one segment schedule for each segment and forms a candidate segment combination for the journey. The front schedule of each journey combination in the journey selection list is the last segment schedule corresponding to the last processed segment (e.g., for journey combination {Leg1Sch1, Leg2Sch1}, the front segment schedule is Leg2Sch1 that is associated with Leg2). The compatible segment schedules obtained for each route are thus used to construct journey combinations that can be used in block 808 of FIG. 9 to determine the best journey options.

The building of journey combinations may include parallel or sequential processing of the segment schedules instead of recursive processing of the segment schedules.

Figure 11:
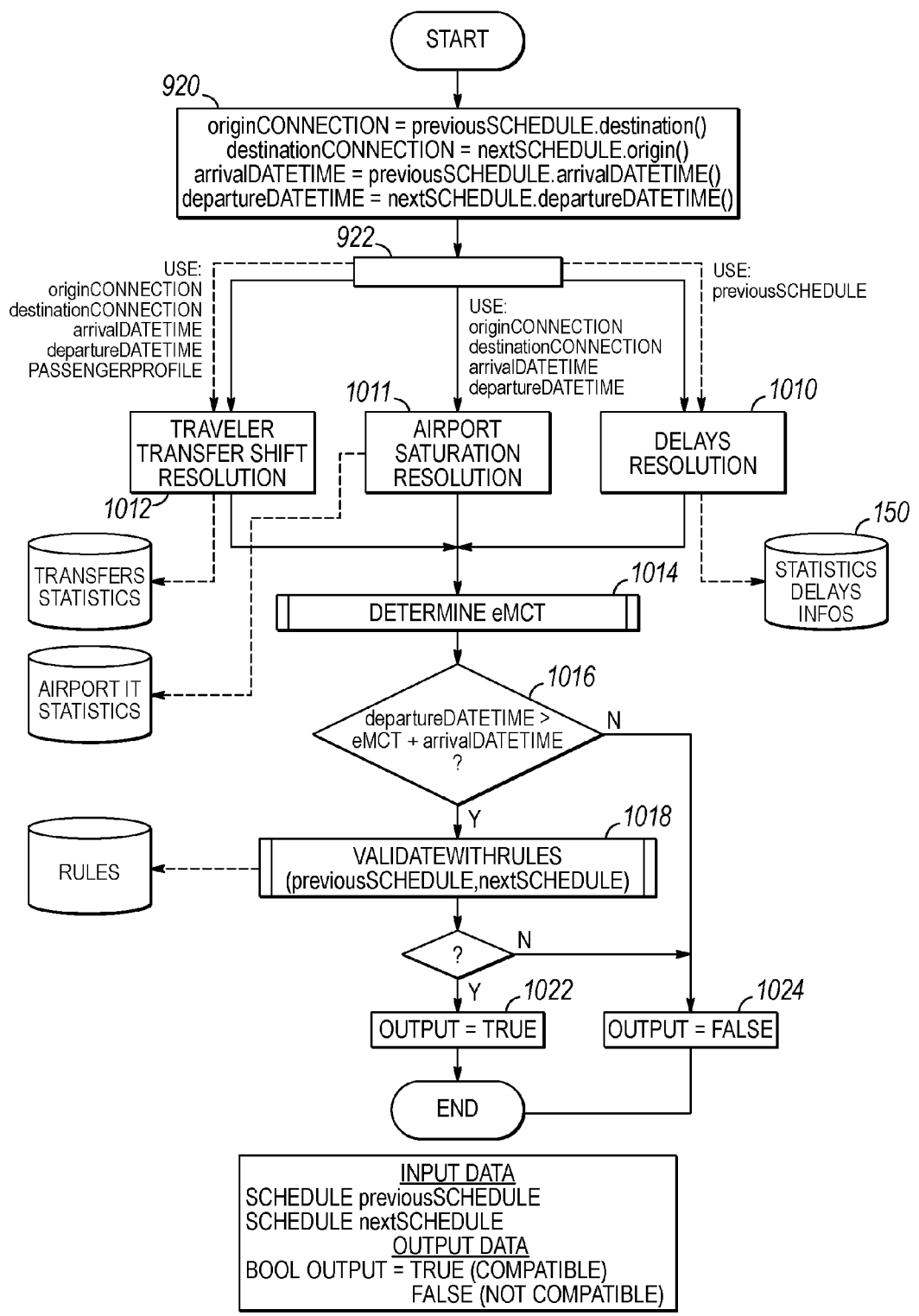
FIG. 11 is a detailed flowchart of checking compatibility of FIG. 10 in accordance with an embodiment of the invention.

FIG. 11 is a detailed flowchart of the compatibility checking step (block 908) for checking compatibility of each pair of segment schedules that connect a connection point for a candidate route. Compatibility checking may be based on a dynamic calculation of the minimum connecting time for each route connection between a pair of segments based on statistical information related to delays or to delay conditioning factors. Representative conditioning factors may include, but are not limited to, delay statistics related to the travel mode(s) of transportation in database 150, statistics related to the saturation of the transport infrastructures used for the connections saturation statistics) in database 151, and statistics related to the connection time per connection (connection time statistics) in database 152.

In blocks 1010, 1011, 1012, statistical information are retrieved from the statistics information databases 150, 151 and 152 using the arrival location (e.g., arrival gate) of the inbound segment at the connection, the departure location (e.g., departure gate) of the outbound segment at the connection, the scheduled departure date and time of the inbound segment of the connection, and the scheduled arrival date and time of the outbound segment of the connection. More specifically, in block 1012, the statistics time estimated for a user to move from the arrival location at the connection to the departure location at the connection is retrieved from the connection time statistics database 152. In block 1011, the delay time related to transport infrastructure saturation is retrieved from the saturation statistics database 151. In block 1010, the delay expected for each segment schedule of the pair is retrieved from the delay database 150.

Passenger profile information 45 (FIG. 3) may be used also to retrieve information from the connection time statistics database 152 in block 1012. In block 1014, a minimum connection time (eMCT) is dynamically estimated for the current connection based on the statistics information received in blocks 1010, 1011 and 1012. In block 1016, an initial compatibility condition related to the estimated minimum connection time (eMCT) is checked for the current connection based on the arrival date/time ("arrivalDate-Time") of the oubound segment of the connection, departure date/time ("departureDateTime") of the inbound segment of the connection, and the estimated minimum connection time (eMCT). More specifically, in block 1016, the time difference between the arrival date/time scheduled for the inbound segment at the connection and the departure date/time scheduled for the outbound segment at the connection should be less than or equal to the minimum transfer time eMCT estimated for the connection is block 1016.

In block 1018, additional compatibility conditions may be checked for the current connection associated with the current pair of segment schedules (previousSchedule, NextSchedule) using a ValidateWithRules( ) function. In particular, the additional compatibility checking may consider whether or not the time difference between the arrival date/time scheduled for the inbound segment at the connection and the departure date/time scheduled for the outbound segment at the connection meets predefined business rules and/or policies rules. For example, if the schedule on the inbound segment uses a business fare, the user may not want to travel using an economy fare on the outbound segment. As another example, the travel providers of the inbound and outbound segments may not be compatible to be booked together for a journey.

If all of the conditions checked in blocks 1016 and 1018 are satisfied, a "true" value is returned (block 1022) indicating that the schedules for the checked pair of segments are compatible. The current connection comprising the pair of segment schedules is then selected in block 910 (FIG. 10) and the next pair of segment schedules is processed in block 909 (FIG. 10).

If all of the conditions checked in blocks 1016 and 1018 are not satisfied, a "false" value is returned (block 1024) indicating that the schedules for the checked pair of segments are not compatible. The pair of segment schedules is then not selected in block 910 (FIG. 10), and the current Journey ("aJourney") is not updated with the new schedule and is not added to the List of journey options (tmpJourneyList). The next pair of segment schedules is then processed in block 909 of FIG. 10.

Figure 12:
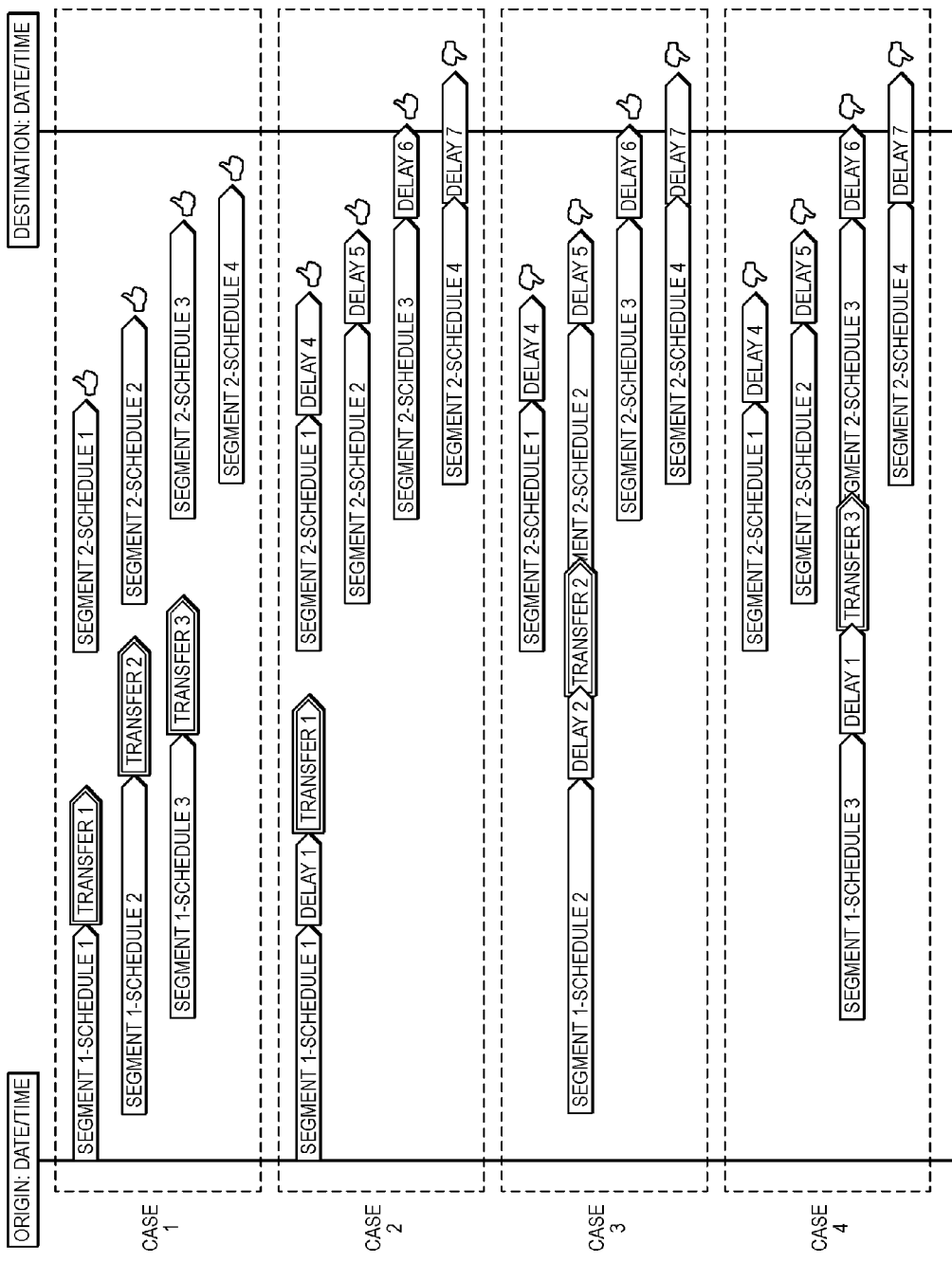
FIG. 12 is an exemplary diagram illustrating journey planning selection in accordance with an embodiment of the invention.

FIG. 12 is an exemplary diagram illustrating the journey planning method, according to an embodiment of the invention. In the example of FIG. 12, the journey request received by the journey planning system 16 is a request for a journey from an origin location (A) to a destination location (B). Further, the journey request specifies that the journey is to commence after a date "DateTime1" and end before a target date "DateTime2". In this example and for ease of illustration only, the route calculation determines only a single route comprising a pair segments, Segment 1 and Segment 2, that are interconnected at a connection location C. Accordingly, the initial segment (Segment 1) extends from the origin point 1 to the connection point C, and the subsequent segment (Segment 2) extends from the connection point C to the destination point B. The example also assumes that three possible segment schedules, referred to respectively as Segment1-Schedule1, Segment1-Schedule2 and Segment1-Schedule3, are determined for Segment 1, and that four possible segment schedules, referred to respectively as Segment2-Schedule1, Segment2-Schedule2, Segment2-Schedule3 and Segment2-Schedule4, are determined for the Segment 2.

The connection times estimated for each combination of segment schedules are indicated in FIG. 12 as "Transfer k" in which k corresponds to the reference number of the segment schedule combination. Similarly, the delay estimated for each segment of each journey combination is indicated in FIG. 12 as "Delay k" in which k corresponds to the journey combination number.

For each combination of interconnected segment schedules corresponding to case 1 of FIG. 12, Table 1 indicates whether or not the journey option meets the minimum connection time (eMCT) condition. Case 1 corresponds to a situation where a delay is not expected for all schedule combinations.

TABLE 1

| Segment 1 | Segment 2 | Is eMCT condition met? |
|---|---|---|
| Schedule 1 | Schedule 1 | Yes |
| Schedule 1 | Schedule 2 | Yes |
| Schedule 1 | Schedule 3 | Yes |
| Schedule 1 | Schedule 4 | Yes |
| Schedule 2 | Schedule 1 | No |
| Schedule 2 | Schedule 2 | Yes |
| Schedule 2 | Schedule 3 | Yes |
| Schedule 2 | Schedule 4 | Yes |
| Schedule 3 | Schedule 1 | No |
| Schedule 3 | Schedule 2 | No |
| Schedule 3 | Schedule 3 | Yes |
| Schedule 3 | Schedule 4 | Yes |

From Table 1, three journey combinations do not meet the eMCT condition. The journey combination (Segment 1-Schedule2)(Segment 2-Schedule1) fails to meet the eMCT condition because (Segment 2-Schedule1) is not compatible with the eMCT. The journey combination (Segment 1-Schedule3)(Segment 2-Schedule1) fails to meet the eMCT condition because (Segment 2-Schedule1) is not compatible with the eMCT. The journey combination (Segment 1-Schedule3)(Segment 2-Schedule2) fails to meet the eMCT condition because (Segment 2-Schedule2) is not compatible with the eMCT.

In cases (2), (3) and (4) of FIG. 12, delay statistics are taken into account below for the journey scheduling determination.

For each combination of interconnected segment schedules corresponding to case 2 of FIG. 12, Table 2 indicates whether or not the journey option meets the minimum connection time (eMCT) condition. The entries in Table 2 reflect which schedules for Segment 2 are determined to be compatible with Segment1-Schedule1.

TABLE 2

| Segment 1 | Segment 2 | Is eMCT condition met? | Consequence on journey options |
|---|---|---|---|
| Schedule 1 | Schedule 1 | Yes | A connection between Segment 1 and Segment 2 is possible, and the Destination DateTime constraint is also satisfied. |
| Schedule 1 | Schedule 2 | Yes | A connection between Segment 1 and Segment 2 is possible, and the Destination DateTime constraint is also satisfied. |
| Schedule 1 | Schedule 3 | Yes | A connection between Segment 1 and Segment 2 is possible, and the Destination DateTime constraint is also satisfied. |
| Schedule 1 | Schedule 4 | No | A connection between Segment 1 and Segment 2 is possible, but the Destination DateTime constraint cannot be satisfied. |

For each combination of interconnected segment schedules corresponding to case 3 of FIG. 12, Table 3 indicates whether or not the journey option meets the minimum connection time (eMCT) condition. The entries in Table 3 reflect the schedules for Segment 2 that are determined to be compatible with Segment1-Schedule2.

TABLE 3

| Segment 1 | Segment 2 | Is eMCT condition met? | Consequence on journey options |
|---|---|---|---|
| Schedule 2 | Schedule 1 | No | A connection between Segment 1 and Segment 2 is not possible |
| Schedule 2 | Schedule 2 | No | A connection between Segment 1 and Segment 2 is not possible |
| Schedule 2 | Schedule 3 | Yes | A connection between Segment 1 and Segment 2 is possible, while satisfying the constraint on the Destination Date/Time. |
| Schedule 2 | Schedule 4 | No | A connection between Segment 1 and Segment 2 is possible, but the constraint on the Destination Date/Time cannot be satisfied. |

For each combination of interconnected segment schedules corresponding to case 4 of FIG. 12, Table 4 indicates whether or not the journey option meets the minimum connection time (eMCT) condition. The entries in Table 4 reflect the schedules for Segment 2 that are determined to be compatible with Segment1-Schedule3.

TABLE 4

| Segment 1 | Segment 2 | Is eMCT condition met? | Consequence on journey options |
|---|---|---|---|
| Schedule 3 | Schedule 1 | No | A connection between Segment 1 and Segment 2 is not possible |
| Schedule 3 | Schedule 2 | No | A connection between Segment 1 and Segment 2 is not possible |
| Schedule 3 | Schedule 3 | No | A connection between Segment 1 and Segment 2 is not possible |
| Schedule 3 | Schedule 4 | No | A connection between Segment 1 and Segment 2 is possible, but the constraint on the Destination Date/Time cannot be satisfied. |

Instead of using static and theoretical information to determine the best journey options, the journey planning system 16 dynamically determines the best journey options (i.e., the journey options that satisfy the relevant request constraints) based on dynamically-computed minimum transfer times, which in turn are based on statistical analysis of actual delay-related data. The traveler experience may be improved by generating a display of a delay indicator for each journey option in which the delay indicator indicates a risk of delay for the corresponding journey (expected delay level) or by taking into account the expected delays per possible journey combination to select the best journey options. Travelers can thus organize their appointments at the final destination location of the selected journey by taking into account the expected delay level or selecting the journey with a delay level that is considered as acceptable by the user.

By using a minimum transfer time that may be dynamically computed for each connection of the possible journey combination from statistics information on delays derived from past travel delays, samples of connection times assessed for past journey connections, or saturation condition in infrastructures used for the connections, the journey planning system 16 may provide journey options with a limited probability of delay and with optimized connections. The journey planning system 16 may ensure that the schedule information of a proposed journey option will be as close as possible to the actual journey conditions, while minimizing the probability that a traveler misses a connection. The traveler experience can be improved and travel providers may receive fewer the complaints from travelers. More generally, the overall organization process of travel providers, such as airlines, can be improved by the journey planning system 16. In particular, complex processes for real-time re-routing of passengers arising from missed connections may be avoided, and the necessity of waiting for passengers until they arrive at the boarding gate corresponding to the departure location for a connecting segment can be limited.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. For example, while the route construction phase and the journey scheduling phase have been described has separate sequential phases, in certain embodiments of the invention, these phases may be performed simultaneously. In addition, while the flowcharts represented in FIGS. 9 and 10 show iterations that are performed recursively, some or all of the iterations may be performed in parallel in certain embodiment of the invention. The invention in its broader aspects is therefore not limited to the specific details, representative apparatus and method, and illustrative examples shown and described.

Accordingly, departures may be made from such details without departing from the spirit or scope of the Applicant's general inventive concept.

What is claimed is:

1. A method for processing a search request for one or more journey options from an origin to a destination, the method comprising:
providing, via a plurality of mobile devices, an application on the mobile device of each of a plurality of first travelers and on the mobile device of each of a plurality of second travelers, wherein the first travelers share a first characteristic, the second travelers share a second characteristic that differs from the first characteristic, and the application is operable to:
transparently collect first geo-location data for each first traveler via the mobile device of the first traveler when the first traveler moves from a first gate of an airport to a second gate of the airport, and transmit the first geo-location data for each first traveler via the mobile device of the first traveler, the first geo-location data for each first traveler including a plurality of first locations for the first traveler that are each associated with a first time, and
transparently collect second geo-location data for each second traveler via the mobile device of the second traveler when the second traveler moves from the first gate of the airport to the second gate of the airport, and transmit the second geo-location data for each second traveler via the mobile device of the second traveler, the second geo-location data for each second traveler including a plurality of second locations for the second traveler that are each associated with a second time,
receiving, at one or more processors, the first geo-location data for each first traveler from the application installed on the mobile device of each first traveler;
receiving, at the one or more processors, the second geo-location data for each second traveler from the application installed on the mobile device of each second traveler;
in response to receiving the first geo-location data for each first traveler, calculating, by the one or more processors, a first average travel time from the first geo-location data for each first traveler that is an average time for the first travelers to move from the first gate of the airport to the second gate of the airport;
in response to receiving the second geo-location data for each second traveler, calculating, by the one or more processors, a second average travel time from the second geo-location data for each second traveler that is an average time for the second travelers to move from the first gate of the airport to the second gate of the airport;
storing, by the one or more processors, the first average travel time and the second average travel time in a first database, wherein the first average travel time is associated with the first characteristic in the first database, and the second average travel time is associated with the second characteristic in the first database;
after storing the first average travel time and the second average travel time, receiving, at the one or more processors, the search request for the one or more journey options; and
in response to the search request being received at the one or more processors:

determining, by the one or more processors, that the search request is submitted for a traveler associated with the first characteristic according to a user profile of the traveler;
resolving, by the one or more processors, a route from the origin to the destination that is a candidate to fulfill the search request, the route including a first segment and a second segment, the first segment being associated with a first schedule that includes a scheduled arrival time for the first segment at the first gate of the airport, and the second segment being associated with a second schedule that includes a scheduled departure time for the second segment from the second gate of the airport;
in response to resolving the route, retrieving, by the one or more processors from a second database, an average delay time for the first segment in relation to the scheduled arrival time of the first schedule;
in response to resolving the route and to determining that the search request is submitted for a traveler associated with the first characteristic, retrieving, by the one or more processors from the first database, the first average travel time;
estimating, by the one or more processors, a minimum connecting time needed at the airport between the scheduled arrival time for the first segment of the route and the scheduled departure time for the second segment of the route by adding the average delay time and the first average travel time;
determining, by the one or more processors, whether a time difference between the scheduled departure time for the second segment of the route and the scheduled arrival time for the first segment of the route is greater than the estimated minimum connecting time;
in response to a determination that the time difference is greater than the estimated minimum connecting time, selecting, by the one or more processors, an aggregation of the first schedule associated with the first segment of the route and the second schedule associated with the second segment of the route for at least one of the one or more journey options; and
in response to a determination that the time difference is less than the estimated minimum connecting time, not selecting the aggregation of the first schedule associated with the first segment of the route and the second schedule associated with the second segment of the route for the one or more journey options.

2. The method of claim 1, wherein at least one of the average delay time and the first average travel time is related to past journeys from the origin to the destination and connecting at the airport over one or more periods of time.

3. The method of claim 1, further comprising:
prior to the search request being received:
determining an infrastructure saturation statistic derived from the first geo-location data for each first traveler by calculating an average wait time in which the first travelers are located at a particular area of the airport from the first geo-location data for each first traveler; and
storing the average wait time in a third database; and
in response to the route being resolved, retrieving the average wait time from the third database, wherein the minimum connecting time is further estimated based on the average wait time.

4. The method of claim 1, further comprising:
prior to the search request being received:

receiving actual delay data indicative of a plurality of actual delays between the scheduled arrival time of the first schedule and a plurality of actual arrival times for the first segment in relation to the scheduled arrival time;

calculating the average delay time from the actual delay data, the average delay time being an average of the actual delays; and storing the average delay time in the second database.

5. The method of claim 4, further comprising:

in response to the determination that the time difference is greater than the estimated minimum connecting time:

determining a delay indicator for each of the at least one of the one or more journey options by calculating a probability that the time difference will be greater than the estimated minimum connecting time from the first geo-location data for each first traveler and the actual delay data; and in response to the request, returning the one or more journey options and the delay indicator for each of the at least one of the one or more journey options to a client device.

6. The method of claim 4, further comprising:

in response to the determination that the time difference is greater than the estimated minimum connecting time:

determining a delay indicator for each of the at least one of the one or more journey options by calculating a probability that the time difference will be greater than the estimated minimum connecting time from the first geo-location data for each first traveler and the actual delay data; and in response to the request, for the at least one of the one or more journey options, returning only each of the at least one of the one or more journey options for which the determined delay indicator is greater than a given threshold to a client device.

7. The method of claim 4, wherein each of the actual delays involves a flight segment, and receiving the actual delay data comprises:

for each of the actual delays, receiving data indicative of the actual delay in response to the flight segment involved in the actual delay being completed.

8. The method of claim 1, wherein calculating the first average travel time from the first geo-location data for each first traveler that is the average time for the first travelers to move from the first gate of the airport to the second gate of the airport comprises:

for each first traveler:

detecting whether the first traveler made one or more stops greater than a predetermined time duration based on the first geo-location data for the first traveler; and in response to detecting that the traveler made the one or more stops:

determining a time for the first traveler to move from the first gate of the airport to the second gate of the airport without the one or more stops based on the first geo-location data for the first traveler, wherein the first average travel time is calculated based on the determined time for the first traveler to move from the first gate of the airport to the second gate of the airport without the one or more stops.

9. A system for processing a search request for one or more journey options from an origin to a destination, the system comprising:

a plurality of mobile devices distributed among a plurality of first travelers and a plurality of second travelers, wherein the first travelers share a first characteristic, the second travelers share a second characteristic that differs from the first characteristic, and each of the mobile devices is provided with an application that is operable to:

transparently collect first geo-location data for each first traveler via the mobile device of the first traveler when the first traveler moves from a first gate of an airport to a second gate of the airport, and transmit the first geo-location data for each first traveler via the mobile device of the first traveler, the first geo-location data for each first traveler including a plurality of first locations for the first traveler that are each associated with a first time, and transparently collect second geo-location data for each second traveler via the mobile device of the second traveler when the second traveler moves from the first gate of the airport to the second gate of the airport, and transmit the second geo-location data for each second traveler via the mobile device of the second traveler, the second geo-location data for each second traveler including a plurality of second locations for the second traveler that are each associated with a second time, and one or more servers comprising at least one processor and at least one memory coupled to the at least one processor, the at least one memory including instructions that, when executed by the at least one processor, cause the one or more servers to:

in response to receiving the first geo-location data for each first traveler from the application installed on the mobile device of each first traveler, calculate a first average travel time from the first geo-location data for each first traveler that is an average time for the first travelers to move from the first gate of the airport to the second gate of the airport;

in response to receiving the second geo-location data for each second traveler from the application installed on the mobile device of each second traveler, calculate a second average travel time from the second geo-location data for each second traveler that is an average time for the second travelers to move from the first gate of the airport to the second gate of the airport;

store the first average travel time and the second average travel time in a first database, wherein the first average travel time is associated with the first characteristic in the first database, and the second average travel time is associated with the second characteristic in the first database; and in response to the search request for the one or more journey options being received after the first average travel time and the second average travel time are stored:

determine that the search request is submitted for a traveler associated with the first characteristic according to a user profile of the traveler;

resolve a route from the origin to the destination that is a candidate to fulfill the search request, the route including a first segment and a second segment, the first segment being associated with a first schedule that includes a scheduled arrival time for the first segment at the first gate of the airport, and the second segment being associated with a second schedule that includes a scheduled departure time for the second segment from the second gate of the airport;

in response to resolving the route, retrieve, from a second database, an average delay time for the first segment in relation to the scheduled arrival time of the first schedule;

in response to resolving the route and to determining that the search request is submitted for a traveler associated with the first characteristic, retrieving, from the first database, the first average travel time;

estimate a minimum connecting time needed at the airport between the scheduled arrival time for the first segment of the route and the scheduled departure time for the second segment of the route by adding the average delay time and the first average travel time;

determine whether a time difference between the scheduled departure time for the second segment of the route and the scheduled arrival time for the first segment of the route is greater than the estimated minimum connecting time;

in response to a determination that the time difference is greater than the estimated minimum connecting time, select an aggregation of the first schedule associated with the first segment of the route and the second schedule associated with the second segment of the route for at least one of the one or more journey options; and in response to a determination that the time difference is less than the estimated minimum connecting time, not select the aggregation of the first schedule associated with the first segment of the route and the second schedule associated with the second segment of the route for the one or more journey options.

10. The system of claim 9, wherein at least one of the average delay time and the first average travel time is related to past journeys from the origin to the destination and connecting at the airport over one or more periods of time.

11. The system of claim 9, wherein the instructions upon execution further cause the one or more servers to:
prior to the search request being received:
determine an infrastructure saturation statistic derived from the first geo-location data for each first traveler by calculating an average wait time in which the first travelers are located at a particular area of the airport from the first geo-location data for each first traveler; and
store the average wait time in a third database; and
in response to the route being resolved, retrieve the average wait time from the third database, wherein the minimum connecting time is further estimated based on the average wait time.

12. The system of claim 9, wherein the instructions upon execution further cause the one or more servers to:
prior to the search request being received:
receive actual delay data indicative of a plurality of actual delays between the scheduled arrival time of the first schedule and a plurality of actual arrival times for the first segment in relation to the scheduled arrival time;
calculate the average delay time from the actual delay data, the average delay time being an average of the actual delays; and
store the average delay time in the second database.

13. The system of claim 12, wherein the instructions upon execution further cause the one or more servers to:
in response to the determination that the time difference is greater than the estimated minimum connecting time:
determine a delay indicator for each of the at least one of the one or more journey options by calculating a probability that the time difference will be greater than the estimated minimum connecting time from the first geo-location data for each first traveler and the actual delay data; and
in response to the request, return the one or more journey options and the delay indicator for each of the at least one of the one or more journey options to a client device.

14. The system of claim 12, wherein the instructions upon execution further cause the one or more servers to:
in response to the determination that the time difference is greater than the estimated minimum connecting time:
determine a delay indicator for each of the at least one of the one or more journey options by calculating a probability that the time difference will be greater than the estimated minimum connecting time from the first geo-location data for each first traveler and the actual delay data; and
in response to the request, for the at least one of the one or more journey options, return only each of the at least one of the one or more journey options for which the determined delay indicator is greater than a given threshold to a client device.

15. The system of claim 9, wherein the instructions upon execution cause the one or more servers to calculate the first average travel time from the first geo-location data for each first traveler that is the average time for the first travelers to move from the first gate of the airport to the second gate of the airport by causing the one or more servers to:
for each first traveler:
detect whether the first traveler made one or more stops greater than a predetermined time duration based on the first geo-location data for the first traveler; and
in response to detecting that the traveler made the one or more stops:
determine a time for the first traveler to move from the first gate of the airport to the second gate of the airport without the one or more stops based on the first geo-location data for the first traveler,
wherein the first average travel time is calculated based on the determined time for the first traveler to move from the first gate of the airport to the second gate of the airport without the one or more stops.

16. A computer program product for processing a search request for one or more journey options from an origin to a destination, the computer program product comprising:
one or more non-transitory computer readable storage mediums;
first instructions stored on the one or more non-transitory computer readable storage mediums that, when executed by a mobile device of each of a plurality of first travelers and by a mobile device of each of a plurality of second travelers, causes an application to be installed on the mobile device of each first traveler and on the mobile device of each second traveler, wherein each of the first travelers share a first characteristic, each of the second travelers share a second characteristic that differs from the first characteristic, and the application is operable to:

transparently collect first geo-location data for each first traveler via the mobile device of the first traveler when the first traveler moves from a first gate of an airport to a second gate of the airport, and transmit the first geo-location data for each first traveler via the mobile device of the first traveler, the first geo-location data for each first traveler including a plurality of first locations for the first traveler that are each associated with a first time, and transparently collect second geo-location data for each second traveler via the mobile device of the second traveler when the second traveler moves from the first gate of the airport to the second gate of the airport, and transmit the second geo-location data for each second traveler via the mobile device of the second traveler, the second geo-location data for each second traveler including a plurality of second locations for the second traveler that are each associated with a second time, and second instructions stored on the one or more non-transitory computer readable storage mediums that, when executed by at least one processor of one or more servers, cause the one or more servers to:

in response to receiving the first geo-location data for each first traveler from the application installed on the mobile device of each first traveler, calculate a first average travel time from the first geo-location data for each first traveler that is an average time for the first travelers to move from the first gate of the airport to the second gate of the airport;

in response to receiving the second geo-location data for each second traveler from the application installed on the mobile device of each second traveler, calculate a second average travel time from the second geo-location data for each second traveler that is an average time for the second travelers to move from the first gate of the airport to the second gate of the airport;

store the first average travel time and the second average travel time in a first database, wherein the first average travel time is associated with the first characteristic in the first database, and the second average travel time is associated with the second characteristic in the first database; and in response to the search request for the one or more journey options being received after the first average travel time and the second average travel time are stored:

determine that the search request is submitted for a traveler associated with the first characteristic according to a user profile of the traveler;

resolve a route from the origin to the destination that is a candidate to fulfill the search request, the route including a first segment and a second segment, the first segment being associated with a first schedule that includes a scheduled arrival time for the first segment at the first gate of the airport, and the second segment being associated with a second schedule that includes a scheduled departure time for the second segment from the second gate of the airport;

in response to resolving the route, retrieve, from a second database, an average delay time for the first segment in relation to the scheduled arrival time of the first schedule;

in response to resolving the route and to determining that the search request is submitted for a traveler associated with the first characteristic, retrieving, from the first database, the first average travel time;

estimate a minimum connecting time needed at the airport between the scheduled arrival time for the first segment of the route and the scheduled departure time for the second segment of the route by adding the average delay time and the first average travel time;

determine whether a time difference between the scheduled departure time for the second segment of the route and the scheduled arrival time for the first segment of the route is greater than the estimated minimum connecting time;

in response to a determination that the time difference is greater than the estimated minimum connecting time, select an aggregation of the first schedule associated with the first segment of the route and the second schedule associated with the second segment of the route for at least one of the one or more journey options; and in response to a determination that the time difference is less than the estimated minimum connecting time, not select the aggregation of the first schedule associated with the first segment of the route and the second schedule associated with the second segment of the route for the one or more journey options.

\* \* \* \* \*